United States Patent
Pehl et al.

(10) Patent No.: US 10,584,794 B2
(45) Date of Patent: Mar. 10, 2020

(54) MECHANICAL SEAL ARRANGEMENT WITH A RELEASE PROTECTION DEVICE

(71) Applicant: EagleBurgmann Germany GmbH & Co. KG, Wolfratshausen (DE)

(72) Inventors: Andreas Pehl, Poing (DE); Joachim Skrzidlo, Wolfratshausen (DE); Berthold Schulten, Geretsried (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 118 days.

(21) Appl. No.: 15/737,025

(22) PCT Filed: Mar. 22, 2016

(86) PCT No.: PCT/EP2016/056222
§ 371 (c)(1),
(2) Date: Dec. 15, 2017

(87) PCT Pub. No.: WO2016/202475
PCT Pub. Date: Dec. 22, 2016

(65) Prior Publication Data
US 2018/0363781 A1   Dec. 20, 2018

(30) Foreign Application Priority Data
Jun. 18, 2015 (DE) .......................... 10 2015 211 223

(51) Int. Cl.
*F16J 15/34* (2006.01)
*F16J 15/36* (2006.01)

(52) U.S. Cl.
CPC ....... *F16J 15/3468* (2013.01); *F16J 15/3472* (2013.01); *F16J 15/363* (2013.01)

(58) Field of Classification Search
CPC ........ F16J 15/34; F16J 15/3464; F16J 15/344; F16J 15/3452; F16J 15/348; F16J 15/36;
(Continued)

(56) References Cited

U.S. PATENT DOCUMENTS 3,356,378 A * 12/1967 Tracy ................... F16J 15/3464
                                                     277/397
3,612,548 A * 10/1971 Tracy ...................... F16J 15/38
                                                     277/385
(Continued)

FOREIGN PATENT DOCUMENTS

CN       203335862 U    12/2013
DE       3338019 A1     5/1985
(Continued)

OTHER PUBLICATIONS

Search Report and Written Opinion issued in Singapore Patent Application No. 112017012345, dated Jun. 27, 2018.
(Continued)

*Primary Examiner* — Kristina R Fulton
*Assistant Examiner* — L. Susmitha Koneru
(74) *Attorney, Agent, or Firm* — Locke Lord LLP; Scott D. Wofsy

(57) ABSTRACT

The invention relates to a mechanical seal arrangement, comprising a rotating slide ring (2) and an stationary slide ring (3), which delimit a sealing gap (4) in between them, wherein the rotating slide ring (2) has a radially inward facing ledge (20) with a contact surface (21), a bellows element (10) for refitting the rotating slide ring (2) in an axial direction (X-X) of the mechanical seal arrangement, and a release protection device (5) for the rotating slide ring (2), wherein the release protection device (5) comprises an inner sleeve (6) with a radially outward facing web (60) that restricts a movement of the rotating slide ring (2) in the axial direction (X-X), and wherein the rotating slide ring (2) is arranged on the inner sleeve (6) so as to be freely movable in the axial direction (X-X).

9 Claims, 3 Drawing Sheets

Figure 1:
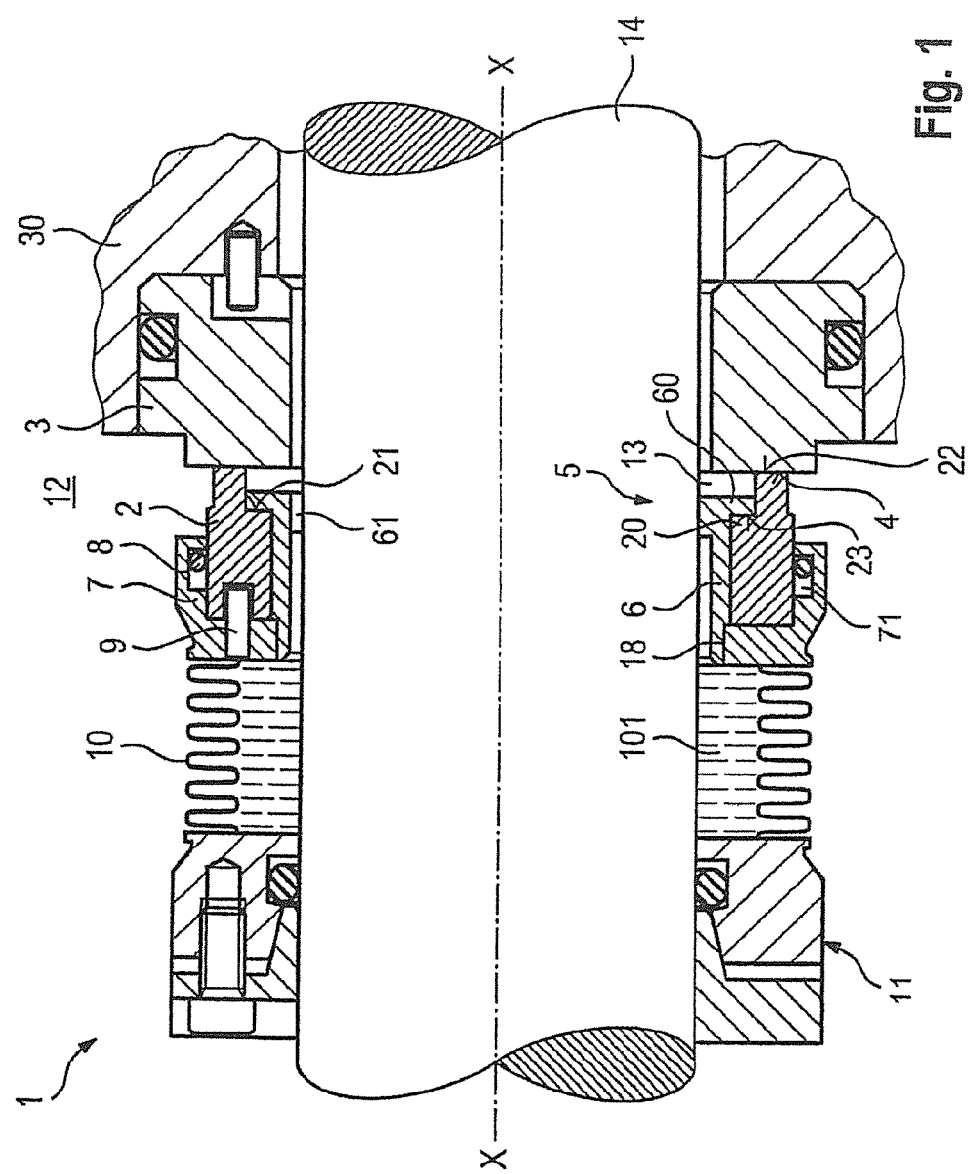

(58) Field of Classification Search
CPC ... F16J 15/3484; F16J 15/3488; F16J 15/3468
See application file for complete search history.

(56) References Cited

U.S. PATENT DOCUMENTS

| | | | | |
|---|---|---|---|---|
| 4,691,927 A | * | 9/1987 | Sudol | F16J 15/363 |
| | | | | 277/360 |
| 5,344,164 A | * | 9/1994 | Carmody | F16J 15/3472 |
| | | | | 277/371 |
| 5,544,897 A | * | 8/1996 | Di Pietro | F16J 15/348 |
| | | | | 277/389 |
| 5,681,047 A | * | 10/1997 | Klostermann | F16J 15/3468 |
| | | | | 277/400 |
| 9,447,885 B2 | | 9/2016 | Suefuji | |
| 2011/0037232 A1 | | 2/2011 | Suefuji | |
| 2016/0053895 A1 | | 2/2016 | Otschik et al. | |

FOREIGN PATENT DOCUMENTS

| | | | | |
|---|---|---|---|---|
| DE | 2002006009762 | * | 9/2006 | ............... F16J 3/047 |
| EP | 0035092 A1 | | 9/1981 | |
| WO | 2014/30423 A1 | | 2/2014 | |
| WO | 2014/161704 A1 | | 10/2014 | |

OTHER PUBLICATIONS

International Search Report, issued in PCT/EP2016/056222, dated Jun. 17, 2016.
Feb. 3, 2019 First Office Action issued by the Chinese Patent Office in connection with counterpart Chinese Application 201680035651.

* cited by examiner

MECHANICAL SEAL ARRANGEMENT WITH A RELEASE PROTECTION DEVICE

CROSS REFERENCE TO RELATED APPLICATIONS

This application is a National Phase Application filed under 35 U.S.C. § 371, based on International Patent Application No. PCT/EP2016/056222, filed on Mar. 22, 2016, which claims the benefit of and priority to German Patent Application No. 102015211223.3, filed Jun. 18, 2015, the entire disclosure and contents which are herein incorporated by reference in their entireties.

The present invention relates to a mechanical seal arrangement with a release protection device for the rotating slide ring, in particular if used with contaminated media.

Mechanical seal arrangements are known from the state of the art in different embodiments. To avoid that a slide ring is released, they are usually shrunk onto a sleeve or the like. In this manner, a force-fit connection between the slide ring and the sleeve is achieved, which prevents any axial movement and release of the slide ring in the axial direction. In particular when sealing contaminated media, e.g. crude oil, slide rings with diamond coating are commonly used. However, due to the coating, such a slide ring cannot be shrunk onto a sleeve, or the like. Especially when it comes to contaminated media, diamond-coated slide rings have the advantage of having a longer service life. Therefore, such slide rings have to be arranged in a loose manner, i.e., they have to be moveable in the axial direction of the mechanical seal arrangement. However, since contaminated media are used, it is possible that dirt particles enter from the medium into a gap at the rotating slide ring, and may lead to a misalignment or a warping at the slide surface.

Thus, it is the objective of the present invention to provide a mechanical seal arrangement which has a loosely inserted slide ring that facilitates a safe refitting in the axial direction and can be used in an unproblematic manner with contaminated media, while at the same time having a simple structure and being easy and cost-effectively to manufacture.

The objective is achieved through a mechanical seal arrangement with the features of claim 1, with the subclaims showing preferred further developments of the invention.

The mechanical seal arrangement according to the invention with the features of claim 1 has a rotating and a stationary slide ring, which delimit a sealing gap in between them. Further, a bellows element is provided, which facilitates a refitting of the rotating slide ring in the axial direction of the mechanical seal. A release protection device prevents an axial release of the rotating slide ring. The release protection device comprises an inner sleeve with a radially outward facing web. At the slide ring, a radially inward facing ledge with a contact surface is provided. At that, the rotating slide ring is freely movable in the axial direction and arranged loosely on the inner sleeve. In this manner, shrinking the rotating slide ring is no longer necessary. The release protection device prevents an undesired release of the rotating slide ring during an axial refitting of the slide ring. Since no shrinking process is required for fixating the rotating slide ring, the rotating slide ring can have a diamond coating, or a different kind of coating. Further, the release protection device is arranged at an internal area of the mechanical seal arrangement, in which the latter does not come into contact with the contaminated medium. In this manner, a high operational safety of the mechanical seal arrangement according to the invention can be ensured. Thus, at the inner sleeve, a clean barrier medium or the like is present, and it is excluded that any contaminants enter between the slide ring and the inner sleeve. Also, no warping or other kind of damage to the slide ring due to the contaminated medium can occur in this manner during operation. Further, a non-destructive disassembly of the rotating slide ring can be facilitated, since no shrinking or the like has to be performed at the sleeve.

It is further preferable if the outward facing web of the inner sleeve is in direct contact with the contact surface at the rotating slide ring. In this manner, a safe movement of the rotating slide ring in the axial direction can be facilitated. Further, the direct contact prevents the undesired release of the rotating slide ring.

Particularly preferably, the contact surface at the rotating slide ring is oriented perpendicular to the axial direction. In this manner, a simple structure can be ensured.

According to a further preferable embodiment of the present invention, the mechanical seal arrangement comprises a spring element that is arranged between the web of the inner sleeve and the contact surface of the rotating slide ring. Here, the spring element provides a spring force in the axial direction and provides a free-of-pay connection between the inner sleeve and the rotating slide ring. The spring element is preferably a wave spring.

It is further preferable to provide an outer sleeve that is connected to the inner sleeve. In this manner, it is possible to transfer a torque transmission from a rotating structural component, e.g. a shaft, to the rotating slide ring via the bellows element and the outer sleeve. Preferably, one or multiple pins, in particular cylindrical pins, are provided for torque transmission between the outer sleeve and the rotating slide ring.

Further, it is preferable if a welded connection is provided between the outer sleeve and the inner sleeve.

According to an alternative embodiment of the present invention, a snap-in connection is provided between the outer sleeve and the inner sleeve. Preferably, two snap-in noses are embodied at the outer sleeve, snapping into corresponding recesses in the inner sleeve. In this manner, it is possible to separate the outer sleeve and the inner sleeve from each other in a non-destructive manner, and also the rotating slide ring can be removed in a non-destructive manner.

For a particularly compact structure, the bellows element is preferably fixedly connected to the outer sleeve.

According to a further preferable embodiment of the present invention, the outer sleeve partially passes the rotating slide ring. In this manner, a protection of that end of the rotating slide ring that is facing away from the sealing gap against the contaminated medium can be achieved. Here, it is particularly preferable if a secondary sealing element, in particular an O-ring, is arranged between the outer sleeve and the rotating slide ring. It is particularly preferable if the secondary sealing element is arranged in a groove in the outer sleeve, wherein the groove is formed at an inner circumferential area of the outer sleeve that is facing towards the rotating slide ring.

What is further preferable is that a contact seal is provided between the outer sleeve and the rotating slide ring. The contact seal is preferably provided at an end of the rotating slide ring and the outer sleeve that is facing away from the sealing gap.

It is particularly preferable if the rotating slide ring has a diamond coating. In this manner, it is possible to use a diamond-coated rotating slide ring which is arranged in a force-free manner and in particular in so as to be resettable in the mechanical seal arrangement in the axial direction.

Further, a non-destructive disassembly of the rotating slide ring is possible. In this manner, only one rotating slide ring can be replaced, and the other structural components of the mechanical seal arrangement, in particular the bellows element, may be reused.

Figure 2:
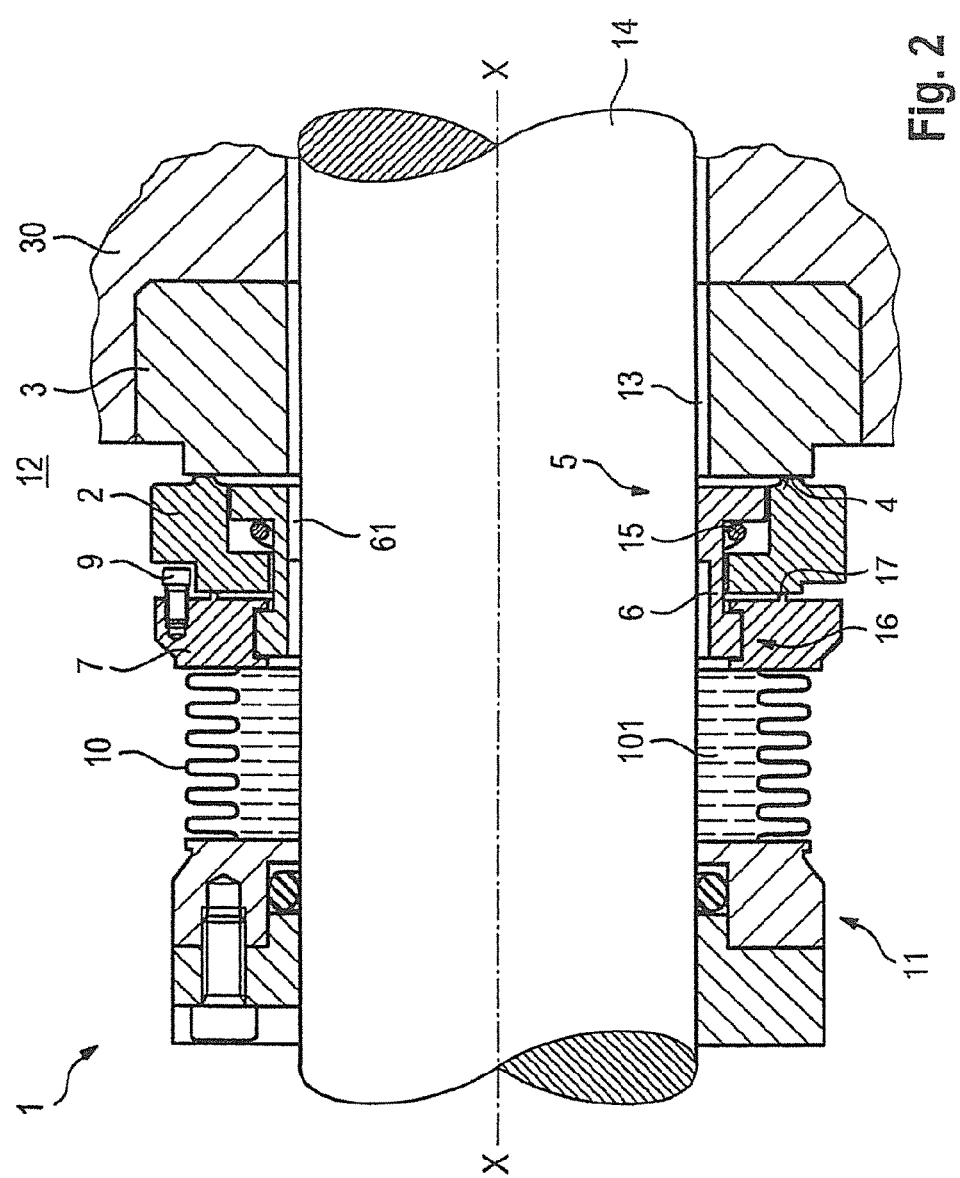
Figure 3:
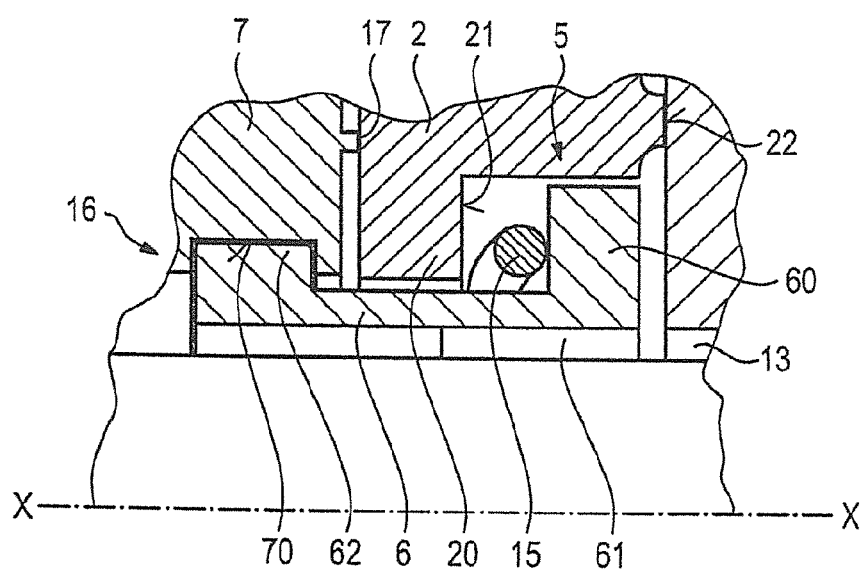

In the following, a mechanical seal arrangement according to preferable exemplary embodiments of the invention is described in detail by referring to the accompanying drawing. Structural components having the same structure and functionality are indicated by the same reference signs in the drawing. Herein:

FIG. 1 shows a schematized sectional view of a mechanical seal arrangement according to a first preferable exemplary embodiment of the invention, FIG. 2 shows a schematized sectional view of a mechanical seal arrangement according to a second preferable exemplary embodiment of the invention, and FIG. 3 shows an enlarged partial sectional view of the release protection device shown in FIG. 2.

In the following, a mechanical seal arrangement 1 according to a first exemplary embodiment of the invention is described in detail by referring to FIG. 1.

As can be seen from FIG. 1, the mechanical seal arrangement 1 comprises a rotating slide ring 2 and a stationary slide ring 3, which define a sealing gap 4 in between them.

The stationary slide ring 3 is affixed at a stationary structural component 30, e.g. a housing or the like.

Here, the mechanical seal arrangement 1 is provided to seal an area 12 in which a contaminated medium is present against an internal area 13 at a rotating structural component 14, e.g. a shaft, by means of a sealing medium, e.g. a barrier fluid, such as e.g. oil or the like.

Further, a bellows element 10 is provided to be able to perform axial compensation movements with the rotating structural component 14, with the bellows element 10 being fixedly connected to a rotating structural component 14 (cf. FIG. 1) via a multi-part bellows fixing unit 11. In this manner, axial movements of the shaft can be compensated by the bellows element 10. The bellows element 10 is preferably made of metal.

To avoid a release of the rotating slide ring 2 in the event of such axial movements, in particular in the event of a reciprocating movement in the axial direction X-X, a release protection device 5 is provided according to the invention.

The release protection device 5 comprises an inner sleeve 6 and an outer sleeve 7.

Here, the rotating slide ring 2 is inserted loosely between the inner sleeve 6 and the outer sleeve 7. At that, the inner sleeve 6 is arranged at an inner circumferential partial area of the rotating slide ring 2, and the outer sleeve 7 is arranged at an outer circumferential partial area of the rotating slide ring 2. Here, the outer sleeve 7 overlaps with an outer shell area of the rotating slide ring 2.

Multiple cylindrical pins 9 are provided for torque synchronization, being inserted into correspondingly formed recesses in the rotating slide ring 2, and fixated at the outer sleeve 7 by means of a press fit. In this manner, a rotation of the rotating structural component 14 can be transferred to the outer sleeve 7 via the multi-part bellows fixing unit 11 and the bellows element 10, and from the outer sleeve 7 can be transferred to the rotating slide ring 2.

Further, a secondary seal 8 in the form of an O-ring is arranged between the outer sleeve 7 and the rotating slide ring 2. For this purpose, a correspondingly formed recess 71 is provided in the outer sleeve 7.

The bellows element 10 is fixedly connected to the outer sleeve 7, for example by means of a welded connection.

Further, the outer sleeve 7 and the inner sleeve 6 are also fixedly connected to each other. Here, preferably also a welded connection 18 is provided.

As can further be seen in FIG. 1, a web 60 is provided at the inner sleeve 6, being arranged at that end of the inner sleeve 6 that is facing towards the sealing gap 4. The web 60 is a ring-shaped circumferential web that abuts a contact surface 21 of the rotating slide ring 2. The contact surface 21 is embodied at a ledge 20 of the rotating slide ring 2. What results in this manner is a contact area 23 between the web 60 and the contact surface 21 that extends in a perpendicular manner with respect to the axial direction X-X. Thus, the contact area 23 between the web 60 and the contact surface 21 extends in the radial direction of the mechanical seal arrangement. Further, the inner sleeve 6 has multiple openings 61 at an inner circumferential area to supply sealing medium from the internal area 13 to the inner area 101 of the bellows element 10.

In contrast to the state of the art, in which the rotating slide ring 2 is fixedly attached at the sleeve by means of a shrink joint, in the present invention the rotating slide ring 2 is arranged in a force-free manner between the inner sleeve 6 and the outer sleeve 7. Thus, the rotating slide ring 2 is loosely inserted onto the inner sleeve 6 before mounting, and subsequently the outer sleeve 7 and the inner sleeve 6 are fixedly connected to each other, e.g. via the welded connection 18. However, by providing the web 60 at the inner sleeve 6, a release of the rotating slide ring 2 from the compound structure between the inner sleeve 6 and the outer sleeve 7 is prevented. Thus, it is in particular possible that a coating, in particular a diamond coating, can be provided at a slide surface 22 of the rotating slide ring 2.

Since the release protection device 5 is substantially arranged at an inner circumference of the rotating slide ring 2, the mechanical seal arrangement 1 can in particular also be used with contaminated media, e.g. in rotating structural components that are used in crude oil production. In particular, it can be prevented here that particles from the medium to be processes travel from the area 12 to the contact area 23 between the web 60 and the contact surface 21, and there can lead to misalignments of the rotating slide ring 2, shifting it from its position in which it is aligned in the axial direction X-X. Such misalignments can lead to undesired wear or a contact between the rotating slide ring 2 and the stationary slide ring 3 in the area of the sealing gap 4. Further, it becomes possible to dismantle and replace the rotating slide ring 2 in a non-destructive manner. Even though the fixed connection between the inner sleeve 6 and the outer sleeve 7 has to be removed for that purpose, the loosely inserted slide ring can be taken out in a simple manner, and a new rotating slide ring 2 can be arranged in a tension-free manner at the release protection device 5.

Further, any jamming of the structural components can be prevented by providing the contact areas 23 between the web 60 and the contact surface 21 perpendicular to the axial direction X-X.

Moreover, the mechanical seal arrangement according to the invention can also be used for processes with pressure reversal.

FIGS. 2 and 3 show a mechanical seal arrangement 1 according to a second exemplary embodiment of the invention.

In contrast to the first exemplary embodiment, in the second exemplary embodiment a release protection device 5 is provided in which a non-destructive, releasable connection between the inner sleeve 6 and the outer sleeve 7 is provided.

In this exemplary embodiment, a snap-in connection 16 is provided between the inner sleeve 6 and the outer sleeve 7. At that, the inner sleeve 6 comprises the snap-in noses 62 which are snapped in into snap-in recesses 70 in the outer sleeve 7, which are formed correspondingly in a complementary shape. This can be seen in detail in FIG. 3. Thus, the snap-in connection 16 is embodied at that end of the inner sleeve 6 that is facing away from the sealing gap 4. What is preferably provided here is a circumferential snap-in nose 62 and a corresponding circumferential snap-in recess 70.

Further, in contrast to the first exemplary embodiment, a wave spring 15 is provided between the web 60 and the contact surface 21 of the rotating slide ring 2. Here, the wave spring exerts a force in the axial direction X-X. The wave spring 15 is has a wavy shape in the circumferential direction, alternatingly abutting at the web 60 and the contact surface 21. Thus, the axial force exerted by the wave spring 15 is distributed substantially evenly in the circumferential direction.

Further, instead of the elastomer seal in the form of a secondary seal 8 that is used in the first exemplary embodiment, in the second exemplary embodiment a contact seal 17 is provided between the outer sleeve 7 and the rotating slide ring 2. In this manner, it is in particular possible to design the mechanical seal 1 of the second exemplary embodiment to be very compact in the radial direction, i.e., perpendicular to the axial direction X-X.

PART LIST 1 mechanical seal arrangement
2 rotating slide ring
3 stationary slide ring
4 sealing gap
5 release protection device
6 inner sleeve
7 outer sleeve
8 secondary seal
9 cylindrical pin
10 bellows element
11 bellows fixing unit
12 area
13 internal area
14 rotating structural component
15 spring element, wave spring
16 snap-in connection
17 contact seal
18 welded connection
20 ledge
21 contact surface
22 slide surface
23 contact area
30 housing
60 web
61 opening in the axial direction
62 snap-in nose
70 snap-in recess
71 recess
101 inner area
X-X axial direction

The invention claimed is:

1. Mechanical seal arrangement, comprising:
a rotating slide ring and a stationary slide ring, which delimit a sealing gap in between them,
wherein the rotating slide ring has a radially inward facing ledge with a contact surface,
a bellows element for refitting the rotating slide ring in an axial direction (X-X) of the mechanical seal arrangement, and
a release protection device for the rotating slide ring,
wherein the release protection device includes an inner sleeve with a radially outward facing web, which restricts a movement of the rotating slide ring in the axial direction (X-X) relative to the stationary slide ring, and an outer sleeve that is connected to the inner sleeve, wherein the rotating slide ring is arranged in between the inner sleeve and the outer sleeve,
wherein the rotating slide ring is arranged on the inner sleeve so as to be freely movable in the axial direction (X-X),
wherein the bellows element is fixedly connected to the outer sleeve, and
a bellows fixing unit being fixedly connected to the bellows unit and a shaft, in order to compensate for axial movement of the shaft.

2. Arrangement according to claim 1, wherein the outward facing web is in direct contact with the contact surface of the rotating slide ring.

3. Arrangement according to claim 1, wherein a spring element is arranged between the web and the contact surface of the rotating slide ring.

4. Arrangement according to claim 1, wherein the contact surface is aligned to be perpendicular to the axial direction (X-X).

5. Arrangement according to claim 1, wherein a connection between the outer sleeve and the inner sleeve is provided as a welded connection.

6. Arrangement according to claim 1, wherein a connection between the outer sleeve and the inner sleeve is embodied as a snap-in connection.

7. Arrangement according to claim 1, further comprising a pin for transferring a torque from the outer sleeve to the rotating slide ring.

8. Arrangement according to claim 1, wherein a contact seal is provided between the outer sleeve and the rotating slide ring.

9. Arrangement according to claim 1, wherein a slide surface of the rotating slide ring has a diamond coating.

* * * * *